(12) United States Patent
Wu et al.

(10) Patent No.: US 9,227,649 B2
(45) Date of Patent: Jan. 5, 2016

(54) JOGGING STROLLER FRAME WITH A FOLDING MECHANISM FOR AUTOMATICALLY FLATTENING WHEELS

(71) Applicant: LERADO (ZHONG SHAN) INDUSTRIAL CO., LTD., Zhong Shan, Guang Dong Province (CN)

(72) Inventors: Tse-Chien Wu, Kaohsiung (TW); Yung-Shuen Lin, Taibao (TW); Shan-Heng Lin, Chiayi County (TW)

(73) Assignee: LERADO (ZHONG SHAN) INDUSTRIAL CO., LTD., Zhong Shan, Guang Dong Povince (CN)

( * ) Notice: Subject to any disclaimer, the term of this patent is extended or adjusted under 35 U.S.C. 154(b) by 0 days.

(21) Appl. No.: 14/482,473

(22) Filed: Sep. 10, 2014

(65) Prior Publication Data

US 2015/0076775 A1    Mar. 19, 2015

(30) Foreign Application Priority Data

Sep. 13, 2013 (CN) .......................... 2013 1 0415828
Sep. 13, 2013 (CN) .......................... 2013 2 0567085

(51) Int. Cl.
*B62B 7/08* (2006.01)
*B62B 7/04* (2006.01)

(52) U.S. Cl.
CPC ................ *B62B 7/083* (2013.01); *B62B 7/044* (2013.01)

(58) Field of Classification Search
CPC .............. B62B 7/00; B62B 7/04; B62B 7/06; B62B 7/062; B62B 7/08; B62B 7/083; B62B 7/086; B62B 7/10; B62B 7/004
USPC ........ 280/639, 38, 642, 647, 650, 657, 47.38, 280/646
See application file for complete search history.

(56) References Cited

U.S. PATENT DOCUMENTS

| 6,402,186 B1 * | 6/2002 | Garland | .................... B62B 7/08 280/47.4 |
| 6,845,991 B1 * | 1/2005 | Ritucci | ................... B62B 3/007 280/30 |
| 7,000,939 B2 * | 2/2006 | Shapiro | ..................... B62B 3/02 280/642 |
| 8,544,857 B2 * | 10/2013 | Schnarr | ..................... B62B 1/12 280/30 |

* cited by examiner

*Primary Examiner* — John Walters
(74) *Attorney, Agent, or Firm* — Muncy, Geissler, Olds & Lowe, P.C.

(57) ABSTRACT

A jogging stroller frame with a wheels automatic flattening folding mechanism is disclosed, which includes a foldable frame, a front wheel set, a pair of rear wheel sets and a driving mechanism. The driving mechanism is associated with the foldable frame for pivoting the front and rear wheels about 90 degrees away from the longitudinal direction automatically during the jogging stroller frame is converting into its folded configuration for storage.

17 Claims, 9 Drawing Sheets

JOGGING STROLLER FRAME WITH A FOLDING MECHANISM FOR AUTOMATICALLY FLATTENING WHEELS

BACKGROUND OF THE INVENTION

1. Field of the Invention

The present invention relates to a jogging stroller frame, especially to a jogging stroller frame provided with a driving mechanism for rotating the front wheel set and the pair of rear wheel sets from a travel direction to a second direction about 90 degrees automatically to convert into a compact size for storage.

2. Description of the Related Art

Jogging strollers are generally formed of lightweight tubular frame members with three large wheels for facilitating the transportation of a child occupant seated therein by a fast walking exercise of a care-giver.

Traditional jogging stroller normally adopted a foldable frame which can be locked in an erected configuration and converted into a generally flattened configuration for compact storage. As the big diameter of wheels always prevents the longitudinal dimension from becoming smaller, the user always need to pull off the wheels from the frame before they can convert the jogging stroller into a relative smaller size for compact storage.

SUMMARY OF THE INVENTION

For eliminating the trouble of pulling off the wheels from the jogging stroller frame for compact storage, the present invention provides a jogging stroller frame with a folding mechanism for automatically flattening wheels for pivoting the wheels away from the longitudinal direction about ninety (90) degrees automatically, while the user converts the jogging stroller into a further smaller size.

The jogging stroller frame with a folding mechanism for automatically flattening wheels according to the present invention may include a foldable frame, a front wheel set, a pair of rear wheel sets and a driving mechanism.

The foldable frame can be locked in an erected configuration for transportation of an occupant seated therein, and a folded configuration for storage in a compact size. Specifically, the foldable frame may have a pair of rear struts and a push arm pivoted with each other at the rear end of the foldable frame, and two sleeves of the rear wheel sets are swivelably sleeved on the lower ends of the pair of rear struts respectively.

The front wheel set is swivelably mounted at the front end of the foldable frame. Specifically, the front wheel set may include a front wheel mount with a lower portion for pivotally connecting the front wheel by an extension element and a top portion for swivelably connecting to a swivel mount.

The front wheel set is swivelably mounted at the front end of the foldable frame. Specifically, the front wheel set may include a front wheel mount with a lower portion for pivotally connecting the front wheel by an extension element and a top portion for swivelably connecting to a swivel mount.

The driving mechanism is mounted and associated between the foldable frame and the pair of rear wheel sets for automatically rotating the pair of rear wheel sets from the travel direction to the second direction by folding and converting the foldable frame from the erected configuration to the folded configuration.

The rear wheel sets of this embodiment each may include a rear wheel mount either connected or formed integrally with the sleeve, and pivotally connects at least a rear wheel on one side thereof. The rear wheel sets are spaced apart from each other so as to keep the two rear wheels from overlapping or intercrossing with each other in the second direction.

When the foldable frame is converted to the folded configuration, the front wheel set is rotated about ninety (90) degrees to a direction parallel to the second direction of the rear wheel sets either by manipulating by hand or associating with the foldable frame. Specifically, the front wheel set may be associated with the foldable frame by a linking rod such that the front wheel set can be rotated to a direction parallel to the second direction of the rear wheel sets automatically as soon as the foldable frame has been converted to the folded configuration.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
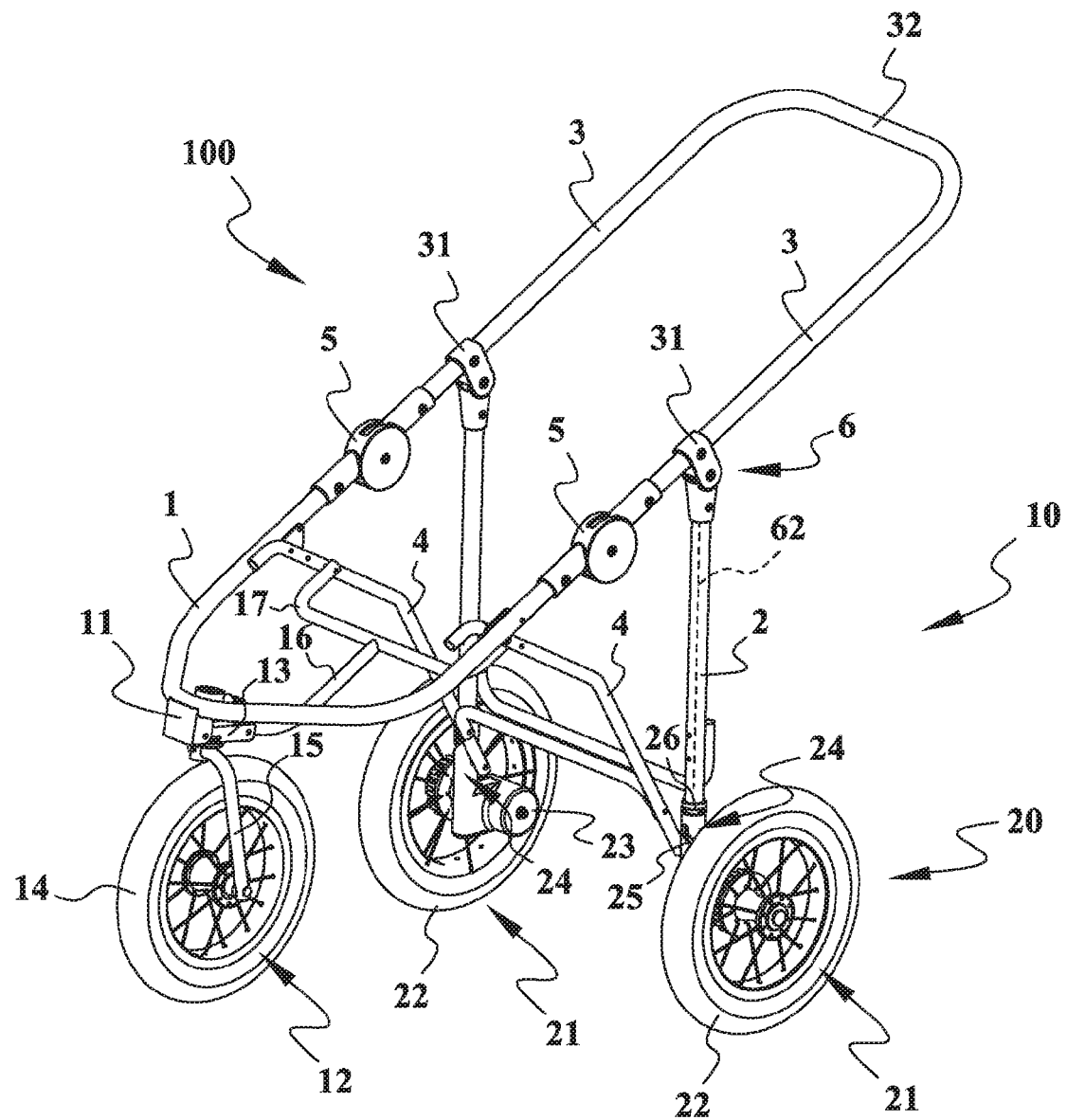
FIG. 1 is a perspective view of an embodiment of the jogging stroller frame with a folding mechanism for automatically flattening wheels according to the present invention.
Figure 2:
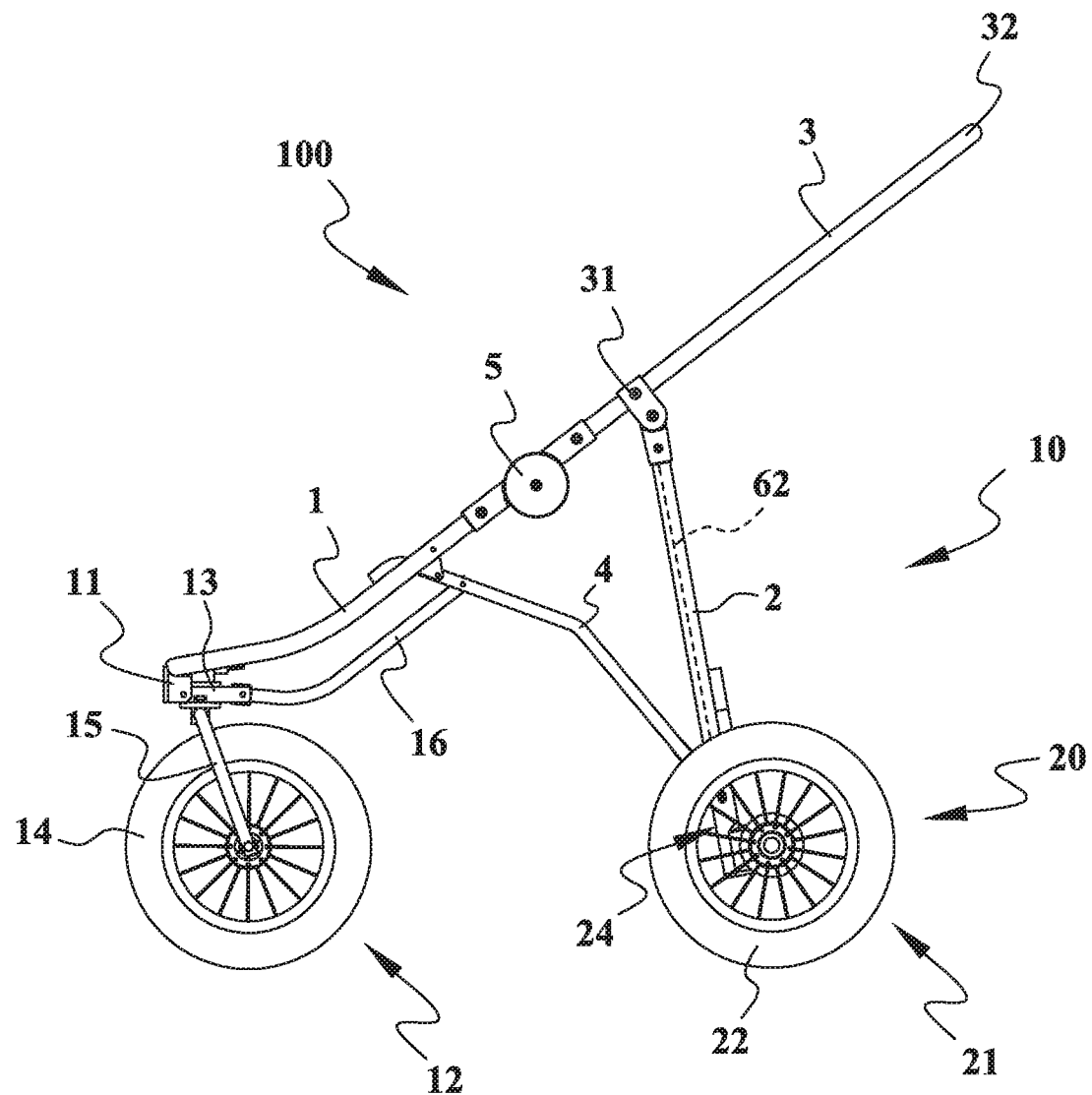
FIG. 2 is a side elevation view of the jogging stroller frame and the folding mechanism for automatically flattening wheels of FIG. 1.
Figure 3:
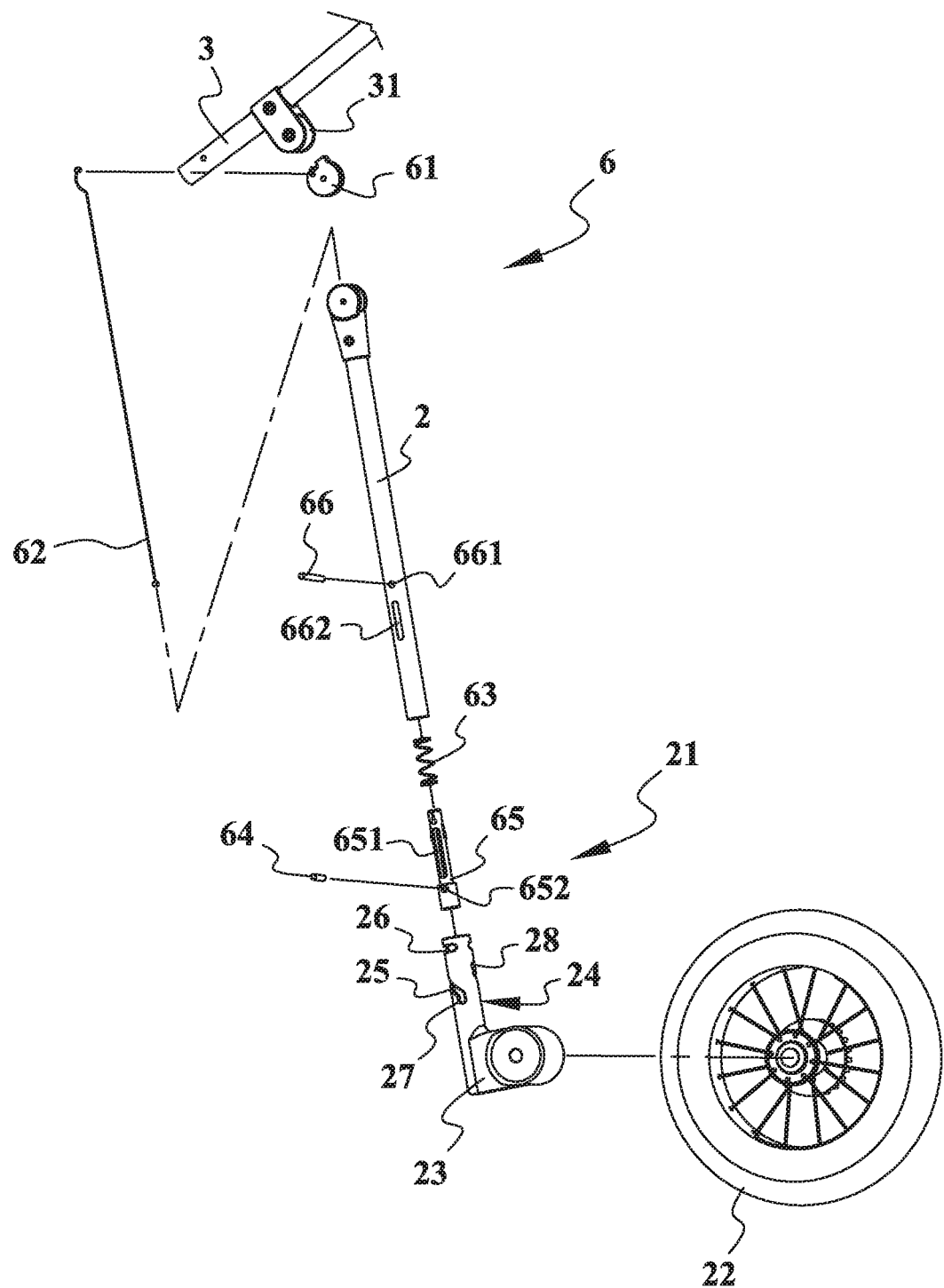
FIG. 3 is an exploded view of the jogging stroller frame and the folding mechanism for automatically flattening wheels of FIG. 1.
Figure 4:
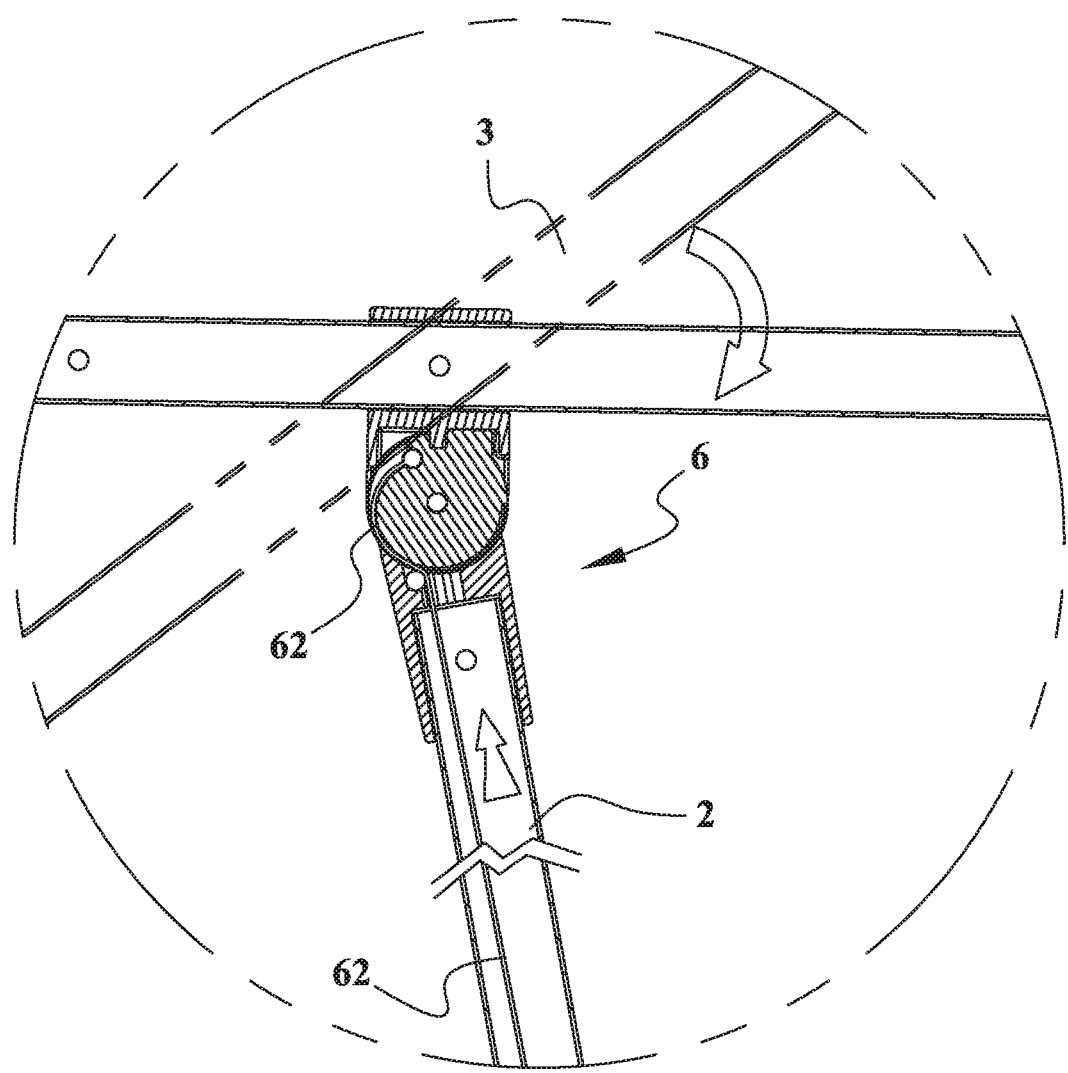
FIG. 4 is a partially enlarged view for schematically showing the operation of the folding mechanism for automatically flattening wheels of FIG. 1.

Referring to FIGS. 1 to 3, an embodiment of the jogging stroller frame with a folding mechanism for automatically flattening wheels according to the present invention includes a foldable frame 10, a front wheel set 12, a pair of rear wheel sets 21 and a driving mechanism 6.

The foldable frame 10 of this embodiment can be locked in an erected configuration 100 for use in a transportation of an occupant seated therein, and a folded configuration 200 for storage in a compact size. Specifically, the foldable frame 10 may include a pair of rear struts 2, a push arms 3 pivoted with each other at the rear end, and two sleeves 24 swivelably sleeved on the lower ends of the pair of rear struts 2.

The front wheel set 12 is swivelably mounted at the front end of the foldable frame 10. Specifically, the front wheel set 12 may include a front wheel mount 13 with a lower portion for pivotally connecting the front wheel 14 by an extension element 15, and a top portion for swivelably connecting to a swivel mount 11.

The pair of rear wheel sets 21 is connected or formed integrally with the sleeves 24. The sleeve 24 are swivelably sleeved on the both sides of rear lower end of the foldable frame 10 for rotating and retaining the pair of rear wheel sets 21 in a travel direction 20 and a second direction 30 transverse to said travel direction 20.

As schematically illustrated in FIGS. 4 to 7, the driving mechanism 6 is mounted and associated between the foldable frame 10 and the pair of rear wheel sets 21 for automatically driving the pair of rear wheel sets 21 to rotate about ninety (90) degrees from the longitudinally travel direction 20 to the second direction 30 by folding and converting the foldable frame 10 from the erected configuration 100 to the folded configuration 200.

Figure 5:
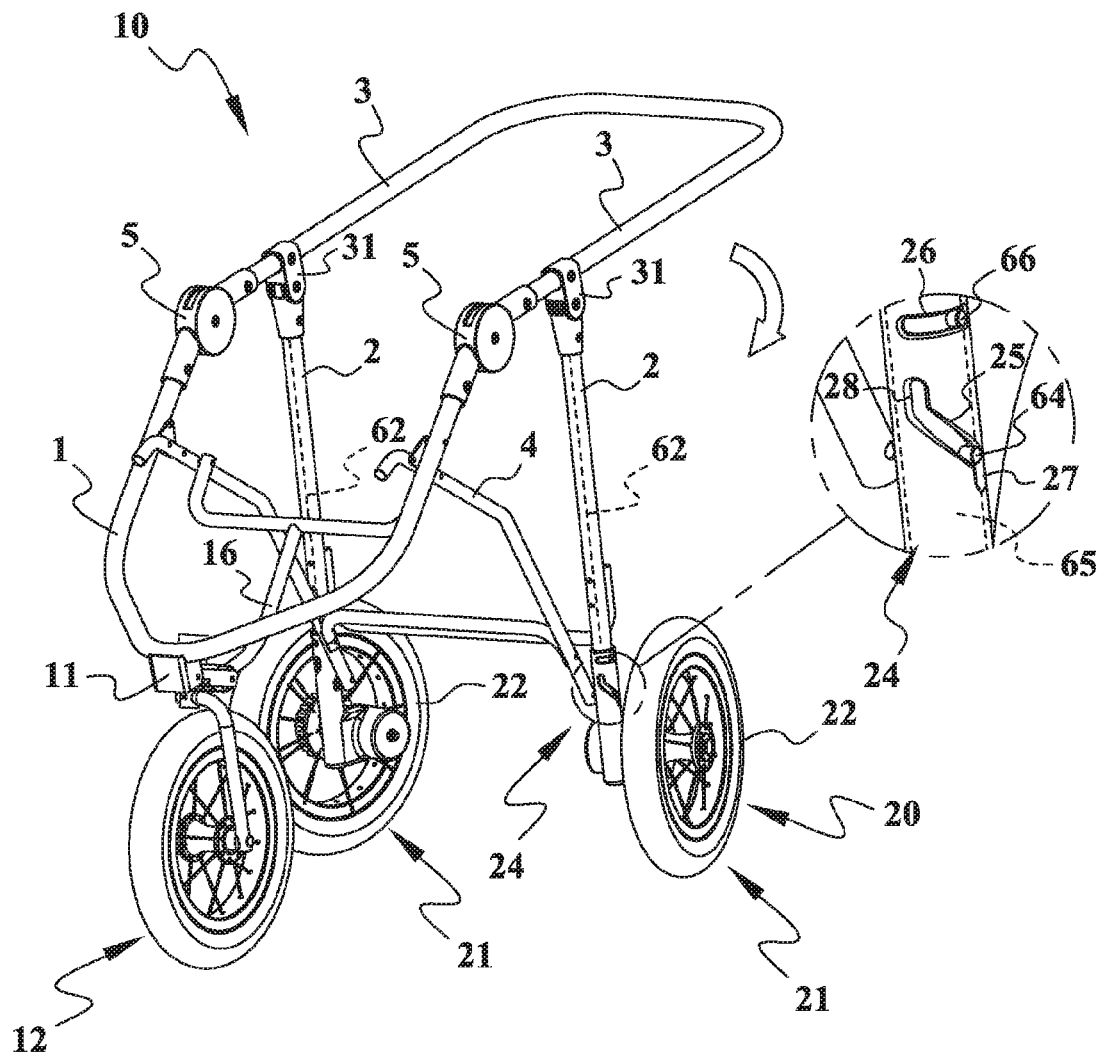
FIG. 5 is a schematic perspective view showing the operation for converting the jogging stroller frame into a folded configuration.

Referring to FIGS. 3, and 5, each rear wheel set 21 of this embodiment includes a rear wheel mount 23 either connected or formed integrally with the sleeve 24, and pivotally connected at least a rear wheel 22 on one side. The rear wheel sets 21 are spaced apart from each other in a way to keep the two rear wheels 22 from overlapping or intercrossing with each other in the second direction 30.

Figure 6:
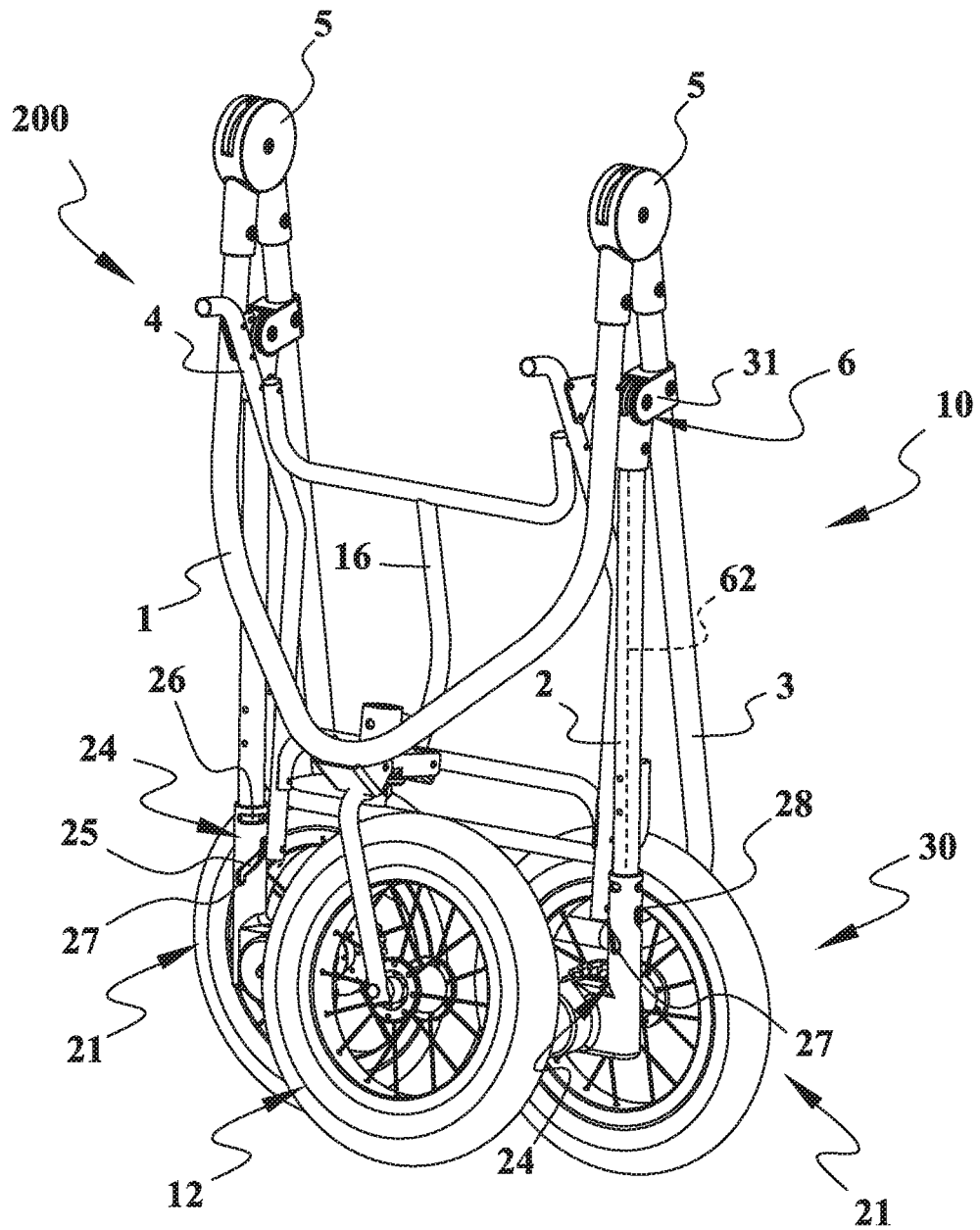
FIG. 6 is a schematic perspective view showing the jogging stroller frame in the folded configuration.
Figure 7:
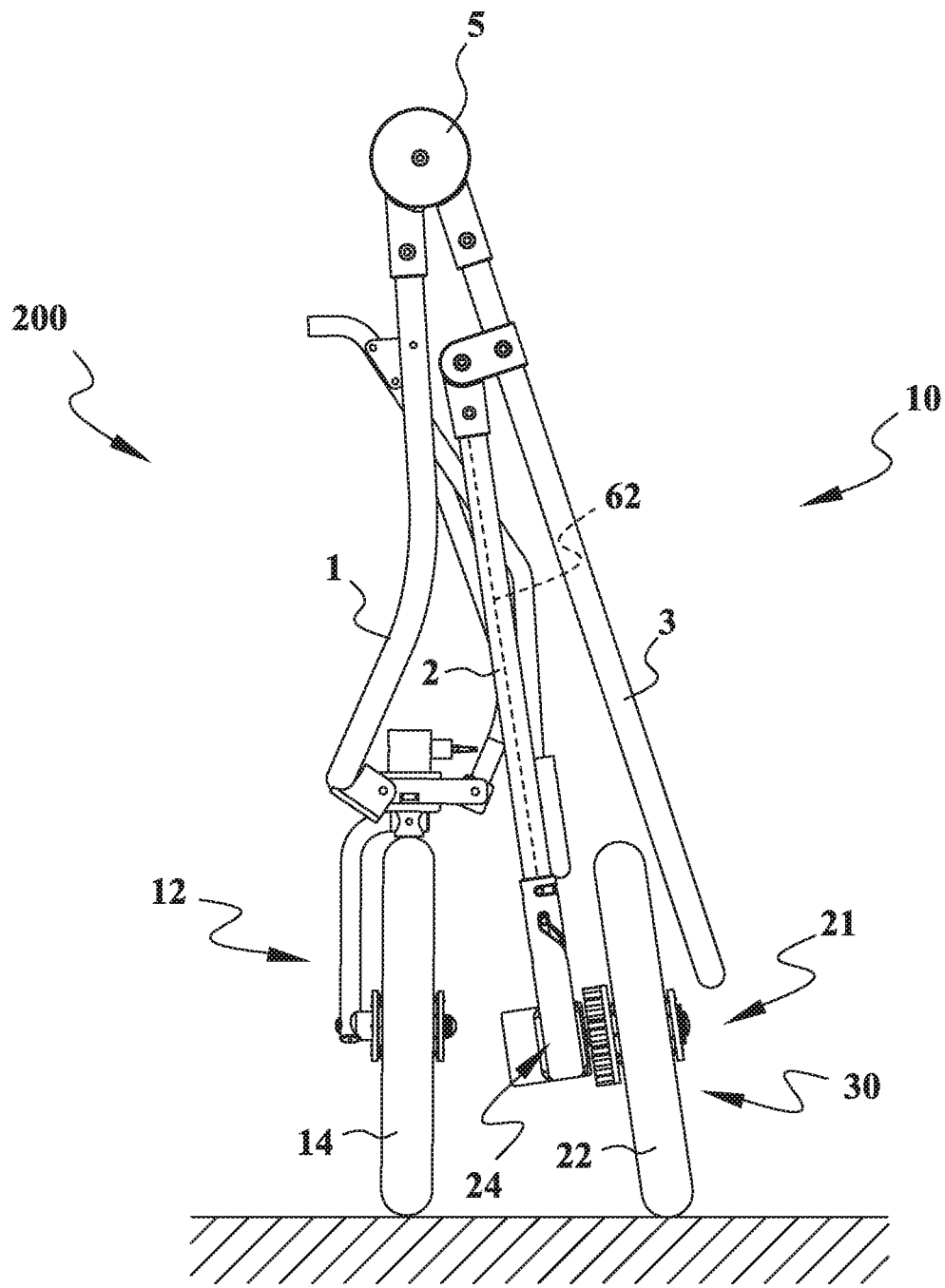
FIG. 7 is a side elevation view showing the jogging stroller frame in the folded configuration.

When the foldable frame 10 is folded and converted to the folded configuration 200 as shown in FIG. 6, the front wheel set 12 shall be rotated about ninety (90) degrees parallel to the second direction 30 of the rear wheel sets 21 either by manipulating by hand or associating with the foldable frame 10. Specifically, as best shown in FIGS. 1 and 2, the front wheel set 12 may be associated with the foldable frame 10 by a linking rod 16 such that the front wheel set 12 can be rotated to the direction parallel to the second direction 30 automatically while the foldable frame 10 is converted to the folded configuration 200.

Specifically, the front strut 1 of the foldable frame 10 includes a front end equipped with the swivel mount 11 for swivelably connecting the front wheel set 12, a seat support frame 4 pivoted to the front strut 1, and a linking rod 16 pivotally connected between the swivel mount 11 and the seat support frame 4, such that when the foldable frame 10 is folding from the erected configuration 100, the seat support frame 4 shall drive the swivel mount 11 to rotate through the linking rod 16, thereby rotating the front wheel set 12 to the direction parallel to the second direction 30 while the foldable frame 10 is folded into the folded configuration 200.

In one embodiment as best shown in FIG. 1, the linking rod 16 may be formed with a fork-linked rod 17 for pivoting to both sides of the seat support frame 4. The push arm 3 has two front lower ends pivoted with the front strut 1 by two lockable joints 5, and a middle portion for gripping by a user's hand for pushing and controlling the foldable frame 10.

Figure 9:
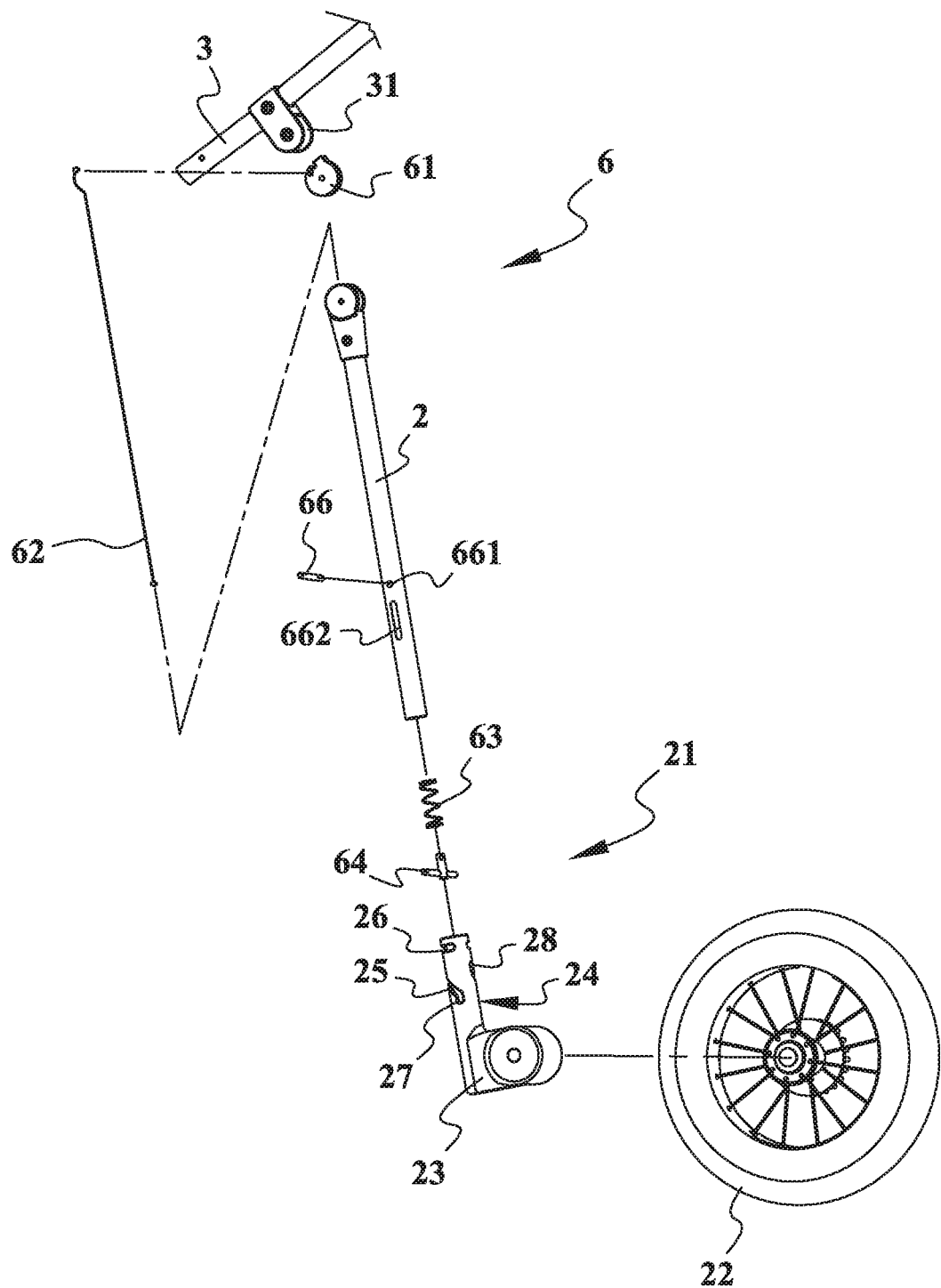
FIG. 9 is an exploded view of another alternative embodiment of the folding mechanism for automatically flattening wheels according to the present invention.

The rear wheel set 21 may include a rear wheel mount 23 which is either connected or formed integrally with the sleeve 24 and pivotally connected with a rear wheel 22 on one side. Specifically, the sleeve 24 is formed with a skewed slot 25 as best shown in FIGS. 3, 5 and 9 for associating with the driving mechanism 6. Preferably, the pair of rear struts 2 each may be formed with a long slot 662 for associating with the sleeve 24 through the skewed slot 25 and a first pin 64.

The driving mechanism 6 according to the present embodiment may include a pair of driving mounts 61, the first pin 64, a return spring 63 and a linking element 62. In this embodiment, the pair of driving mounts 61 is associated with the push arm 3 and the first pin 64 is slidably inserted and received in the long slot 662 with one end slidably inserted and received in the skewed slot 25. The return spring 63 is connected and biased on the first pin 64 for driving the sleeve 24 of the rear wheel sets 21 through the skewed slot 25, thereby normally keeping the pair of rear wheel sets 21 in the travel direction 20.

The linking element 62 is associated and connected between the driving mount 61 and the first pin 64 such that when the foldable frame 10 is converted from the erected configuration 100 to the folded configuration 200, the push arm 3 rotates the driving mounts 61 and pulls the first pin 64 against the biasing force of the return spring 63 thereby rotating the pair of rear wheel sets 21 to the second direction 30.

Preferably, the driving mechanism 6 may further include a slider 65 connected with the linking element 62, the return spring 63 and the first pin 64. The slider 65 in this embodiment may be formed with a connectable portion 652 for mounting the first pin 64 therein and permitted the first pin 64 having one end protruded outward to insert into the skewed slot 25 and the long slot 662.

By this assembly, the slider 65 may reciprocally carry the first pin 64 to move along the long slot 662 for rotating the pair of rear wheel sets 21 between the travel direction 20 and the second direction 30.

As best shown in FIGS. 1 and 2, the push arm 3 may be equipped with two lugs 31 mounted on its two sides for pivoting the pair of rear struts 2. The pair of driving mounts 61 may be mounted on the push arm 3 and rotatable relative to the pair of rear struts 2.

The linking element 62 of this embodiment may either be embodied as a flexible member or solid rod, which has one end connected to the driving mount 61 and another end connected to the slider 65.

Referring to FIG. 3, in order to prevent the sleeve 24 from over-turning to any useless angles, the sleeve 24 may further be formed with a slot 26, and the pair of rear struts 2 each may be formed with a connectable portion 661 for mounting a positioning pin 66 therein. The positioning pin 66 is slidably inserted and engaged within the slot 26 thereby limiting the rotation of the sleeve 24 within the range as defined by the travel direction 20 and the second direction 30. In this embodiment, the slider 65 is formed with a long slot 651 for permitting the positioning pin 66 to pass without obstacle.

It is appreciated that the skewed slot 25 may be formed with a first vertical section 28 at one end for positioning the first pin 64 thereby stably locking the sleeve 24 in the second direction 30.

Referring to FIG. 5, it would also be appreciated that the skewed slot 25 may further be formed with a second vertical section 27 at one end for positioning the first pin 64 thereby stably locking the sleeve 24 in the travel direction 20, so as to prevent the rear wheel sets 21 from wobbling when the foldable frame 10 is in the erected configuration 100 for traveling on the road.

Figure 8:
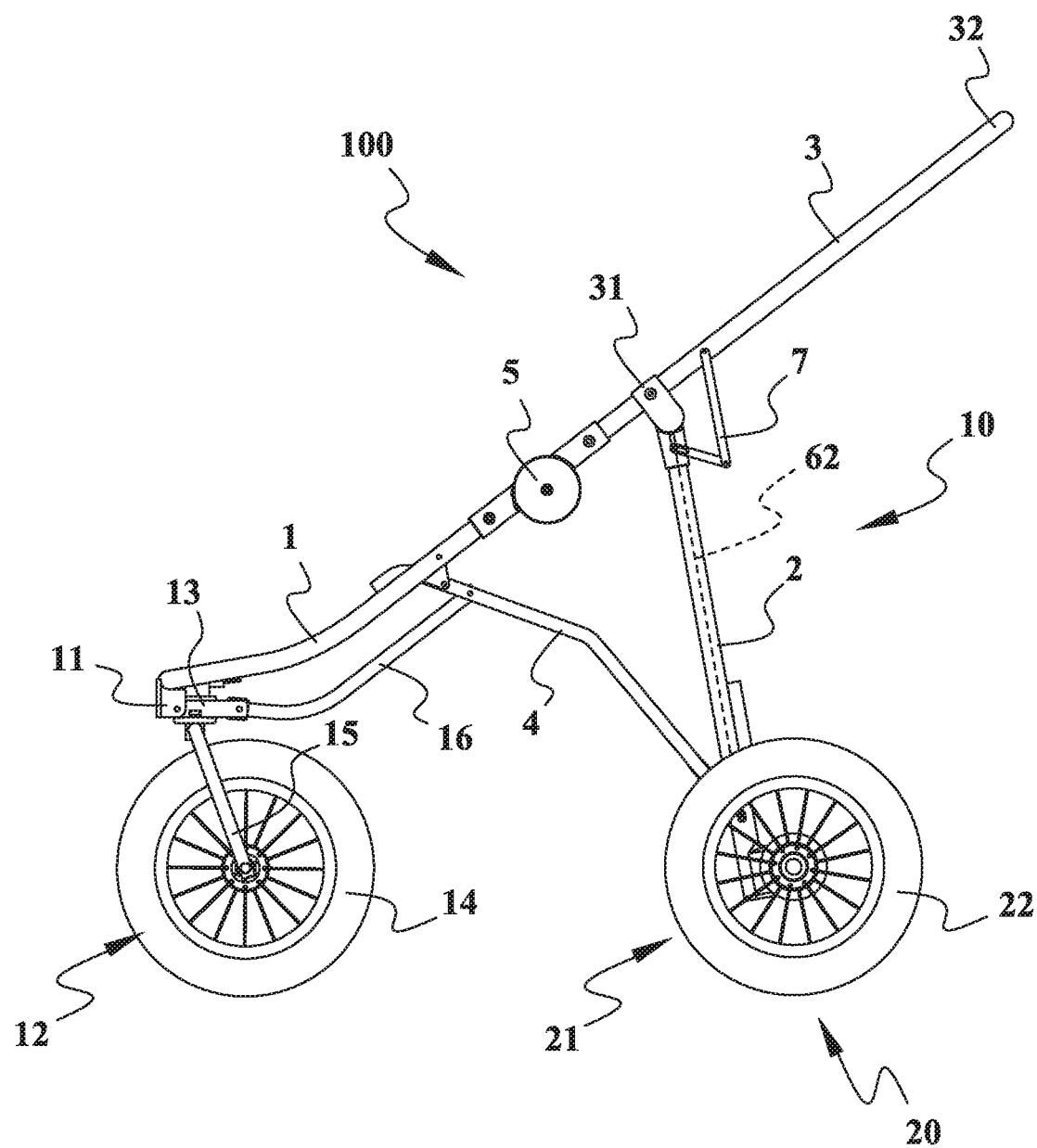
FIG. 8 is a side elevation view of the jogging stroller frame and an alternative embodiment of the folding mechanism for automatically flattening wheels according to the present invention.

Referring to the alternative embodiment illustrated in FIG. 8, the driving mounts 61 may be replaced to further include a pair of joint arms 7 for associating the driving mounts 61 and the pair of joint arms 7. In this embodiment, the driving mounts 61 are pivotally mounted in the rear struts, and the pair of joint arms 7 has one end pivoted on the push arm 3, and another end connected to the driving mounts 61, so as to pull the first pin 64 through the linking element 62 by rotating the push arm 3.

Referring to another alternative embodiment illustrated in FIG. 9, the slider 65 of the embodiment of FIG. 3 may be replaced by a small and simple shaft perpendicularly connected with the first pin 64. The shaft is connected to the linking element 62, however it permits the return spring 63 to bias the first pin 64 directly.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A jogging stroller frame with a folding mechanism for automatically flattening wheels, including:
    a foldable frame, having an erected configuration for transportation of an occupant, and a folded configuration for storage;
    a front wheel set, swivelably mounted at a front end of the foldable frame, wherein the front wheel set is associated with the foldable frame by a linking rod such that the front wheel set can be rotated to a direction parallel to the second direction of the rear wheel sets as soon as the foldable frame has been converted to the folded configuration;
    a pair of rear wheel sets, each having a rear wheel and a sleeve swivelably sleeved on a rear lower end of the foldable frame thereby rotating and retaining the rear wheel between a first direction parallel to a travel direction and a second direction transverse to said first direction; and
    a driving mechanism, mounted and associated between the foldable frame and the pair of rear wheel sets thereby automatically driving the pair of rear wheel sets from the first direction to the second direction by converting the foldable frame from the erected configuration to the folded configuration.

2. The jogging stroller frame with a folding mechanism for automatically flattening wheels of claim 1, wherein the foldable frame has a pair of rear struts and a push arm pivoted at the rear end thereof, and the sleeves of the rear wheel sets are swivelably sleeved on the lower ends of the pair of rear struts.

3. The jogging stroller frame with a folding mechanism for automatically flattening wheels of claim 1, wherein the rear wheel sets each includes a rear wheel mount formed with the sleeve and pivotally connecting at least the rear wheel on one side thereof, the rear wheel sets being spaced apart from each other such that keeps the two rear wheels from overlapping or intercrossing with each other in the second direction.

4. The jogging stroller frame with a wheels automatic flattening folding mechanism for automatically flattening wheels of claim 1, wherein the front wheel set is swiveled to a direction parallel to the second direction of the rear wheel sets when the foldable frame has been converted to the folded configuration.

5. A jogging stroller frame with a folding mechanism for automatically flattening wheels, including:
    a foldable frame, having an erected configuration for transportation of an occupant and a folded configuration for storage;
    a front wheel set, swivelably mounted at a front end of the foldable frame;
    a pair of rear wheel sets, each having a rear wheel and a sleeve swivelably sleeved on a rear lower end of the foldable frame thereby rotating and retaining the rear wheel between a first direction parallel to a travel direction and a second direction transverse to said first direction; and
    a driving mechanism, mounted and associated between the foldable frame and the pair of rear wheel sets thereby automatically driving the pair of rear wheel sets from the first direction to the second direction by converting the foldable frame from the erected configuration to the folded configuration;
    wherein the foldable frame includes at least a front strut that has a swivel mount for swivelably connecting the front wheel set, a seat support frame pivoted to the front strut, and a linking rod pivotally connected between the swivel mount and the seat support frame, such that when the foldable frame is folding from the erected configuration, the rotation of the seat support frame drives the swivel mount through the linking rod, thereby rotating the front wheel set toward a direction parallel to the second direction of the rear wheel sets until the foldable frame has been converted to the folded configuration.

6. The jogging stroller frame with a folding mechanism for automatically flattening wheels of claim 5, wherein the front wheel set includes a front wheel mount having a lower portion pivotally connected with a front wheel by an extension element and a top portion swivelably connected to the swivel mount.

7. The jogging stroller frame with a folding mechanism for automatically flattening wheels of claim 5, wherein the rear wheel set includes a rear wheel mount connected with the sleeve and pivotally connected with the rear wheel on one side thereof; the sleeve being formed with a skewed slot for association with the driving mechanism.

8. A jogging stroller frame with a folding mechanism for automatically flattening heels including:
    a foldable frame, having an erected configuration for transportation of an occupant, and a folded configuration for storage;
    a front wheel set, swivelably mourned at a front end of the foldable frame;
    a pair of rear wheel sets, each having a rear wheel and a sleeve swivelably sleeved on a rear lower end of the foldable frame thereby rotating and retaining the rear wheel between a first direction parallel to a travel direction and a second direction transverse to said first direction; and
    a driving mechanism, mounted and associated between the foldable frame and the pair of rear wheel sets thereby automatically driving the pair of rear wheel sets from the first direction to the second direction by converting, the foldable frame from the erected configuration to the folded configuration;
    wherein the foldable frame has a pair of rear struts and a push arm pivoted at the rear end thereof, and the sleeves of the rear wheel sets are swivelably sleeved on the lower ends of the pair of rear struts;
    wherein the sleeve is formed with a skewed slot, the pair of rear struts each is formed with a long slot, and the driving mechanism includes:
    a pair of driving mounts associated with the push arm;
    a first pin slidably received in the long slot and having one end slidably inserted and received in the skewed slot;
    a return spring connected and biased on the first pin for moving the sleeve of the rear wheel sets through the skewed slot thereby rotating the pair of rear wheel sets to the first direction; and
    a linking element associated and connected between the driving mount and the first pin, when the foldable frame is converted from the erected configuration to the folded configuration, the push arm rotates the driving mounts and pulls the first pin against the return spring thereby rotating the pair of rear wheel sets to the second direction.

9. The jogging stroller frame with a folding mechanism for automatically flattening wheels of claim 8, wherein the driving mechanism further includes a slider connected with the linking element, the return spring and the first pin thereby reciprocally carrying the first pin moving along the long slot.

10. The jogging stroller frame with a folding mechanism for automatically flattening wheels of claim 9, wherein the linking element is a flexible member each having one end connected to the driving mount and another end connected to the slider.

11. The jogging stroller frame with a flattening folding mechanism for automatically flattening wheels of claim 9, wherein the linking element is a solid rod each having one end connected to the driving mount and another end connected to the slider.

12. The jogging stroller frame with a folding mechanism for automatically flattening wheels of claim 8, wherein the push arm has two lugs for pivoting the pair of rear struts; the pair of driving mounts are mounted on the push arm and rotatable relative to the pair of rear struts.

13. The jogging stroller frame with a folding mechanism for automatically flattening wheels of claim 8, wherein the sleeve is formed with a slot, and the pair of rear struts each has a positioning pin slidably inserted and engaged within the slot thereby limiting the rotation of the sleeve between the longitudinally travel direction and the second direction.

14. The jogging stroller frame with folding mechanism for automatically flattening wheels of claim 8, wherein the skewed slot has a first vertical section formed at one end thereof for positioning the first pin thereby stably locking the sleeve in the second direction.

15. The jogging stroller frame with a folding mechanism for automatically flattening wheels of claim 8, wherein the skewed slot has a second vertical section formed at one end thereof for positioning the first pin thereby stably locking the sleeve in the first direction, so as to prevent wobbling of the rear wheel sets during the foldable frame is kept in the erected configuration.

16. The jogging stroller frame with a folding mechanism for automatically flattening wheels of claim 8, wherein the pair of driving mounts is pivotally mounted in the rear struts and associated with the push arm by a pair of joint arms, the pair of joint arms has one end pivoted on the push arm, and another end connected to the driving mounts so as to pull the first pin through the linking element by rotating the push arm.

17. The jogging stroller frame with a folding mechanism for automatically flattening wheels of claim 8, wherein the pair of driving mounts is fixedly mounted on the push arm and associated with the first pin through the linking element.

* * * * *